(12) United States Patent
Ross, Jr.

(10) Patent No.: US 8,604,934 B2
(45) Date of Patent: Dec. 10, 2013

(54) SYSTEM AND METHOD FOR OPTICALLY DETECTING LOW LIQUID LEVEL CONDITION

(75) Inventor: Herbert G. Ross, Jr., Argyle, TX (US)

(73) Assignee: Texas LFP, LLC, Dallas, TX (US)

( * ) Notice: Subject to any disclaimer, the term of this patent is extended or adjusted under 35 U.S.C. 154(b) by 474 days.

(21) Appl. No.: 12/886,381

(22) Filed: Sep. 20, 2010

(65) Prior Publication Data

US 2012/0068849 A1 Mar. 22, 2012

(51) Int. Cl.
*G08B 21/00* (2006.01)

(52) U.S. Cl.
USPC .................. 340/618; 340/438; 340/870.09

(58) Field of Classification Search
USPC .............. 340/618, 603, 612, 686.1, 688, 623, 340/625, 626, 450, 450.2, 425.5, 438, 340/870.09, 870.16, 870.38, 629
See application file for complete search history.

(56) References Cited

U.S. PATENT DOCUMENTS

| | | | |
|---|---|---|---|
| 4,688,028 A | 8/1987 | Conn | |
| 5,410,913 A | 5/1995 | Blackburn | |
| 5,780,711 A | 7/1998 | Glazebrook | |
| 6,023,970 A * | 2/2000 | Blaine | 73/304 R |
| 6,041,650 A * | 3/2000 | Swindler et al. | 73/317 |
| 6,336,362 B1 | 1/2002 | Duenas | |
| 6,398,382 B1 * | 6/2002 | Boyce et al. | 362/101 |
| 6,437,697 B1 | 8/2002 | Caro | |
| 6,564,632 B2 | 5/2003 | Ross, Jr. | |
| 6,742,396 B2 * | 6/2004 | Schenk, Jr. | 73/735 |
| 6,822,565 B2 | 11/2004 | Thomas et al. | |
| 7,219,546 B2 * | 5/2007 | Ross, Jr. | 73/317 |
| 7,652,563 B2 | 1/2010 | Kuhnly et al. | |
| 2008/0298843 A1 * | 12/2008 | Hobo et al. | 399/238 |
| 2009/0058666 A1 * | 3/2009 | Clabaugh | 340/618 |

* cited by examiner

*Primary Examiner* — Daniel Previl
(74) *Attorney, Agent, or Firm* — Alvin R. Wirthlin

(57) ABSTRACT

A system and method for remotely determining a liquid level condition within a tank includes a liquid level gauge connectable to the tank, a dial assembly associated with the liquid level gauge and an optical transceiver for determining a reflectivity of the dial assembly. The dial assembly includes a reflective layer, a blocking layer positioned over the reflective layer for blocking at least a portion of the reflective layer, and a disk that is magnetically coupled to the liquid level gauge. One of the reflective and blocking layers is associated with the disk for rotation therewith. The optical transceiver is positioned for projecting radiant energy toward the reflective layer and detecting the presence or absence of reflected radiant energy and for generating a signal indicative of a low liquid level condition within the tank when at least a substantial portion of the reflective layer is covered by the blocking layer or when a failure occurs in the system to thereby provide a fail-safe mode of operation.

19 Claims, 7 Drawing Sheets

SYSTEM AND METHOD FOR OPTICALLY DETECTING LOW LIQUID LEVEL CONDITION

BACKGROUND OF THE INVENTION

This invention relates to indicating devices for displaying liquid level condition within a tank or other container, and more particularly to a system and method for optically determining and remotely signaling a low liquid level condition within a tank.

Conventional forklifts typically include a vehicle frame, a mast attached to the front end of the vehicle frame, a fork carriage adapted for elevational movement along the mast to raise and lower loads, and a counterweight located at the rear end of the vehicle frame for retaining balance of the forklift as heavyweight loads are lifted. An engine is typically mounted at the center of the vehicle frame and usually is covered with a hood. A driver's seat is typically fixedly secured to the hood and surrounded by an overhead guard which defines a cabin. Many such forklifts are powered by liquid propane and therefore include a liquid propane tank that is removably mounted for the purpose of refueling on a support structure of the counterweight. In order to prevent forklift down time or the chance of fuel outage at a location remote from the replacement tank, the propane tank is often replaced before it is completely empty. Since some tanks do not have a fuel gauge, a significant amount of cost can be incurred since useful amounts of propane may be left in the tank upon replacement. Even if a fuel sight gauge is provided, the dial indicator is not readily viewable by an operator.

In order to overcome this disadvantage, remote ready gauges have been provided. Such gauges employ a magnetically driven dial for physically viewing the liquid level as well as a magnetic flux field sensor mounted on the dial for monitoring a position of the dial and generating an electric signal indicative of liquid level within the tank. Such a device is disclosed in U.S. Pat. No. 6,564,632 issued to Herbert G. Ross, Jr. on May 20, 2003. Although this device can provide the operator a means for remotely viewing the liquid level condition within the tank without leaving the operating position, it can become damaged if precautions are not observed. For example, if the magnetic flux field sensor is not removed from the gauge head before the tank is exchanged, the sensor, transmission cable and/or dial can become damaged and thus prevent transmission of the liquid level condition to the remote position.

Moreover, although it is convenient for an operator to view the liquid level condition of the tank from the operating position, the operator is preoccupied with the task at hand which often requires precise maneuvering of heavy overhead loads between narrowly spaced rows of stacked inventory items. Consequently, little attention may be paid to the remote indicator until the forklift runs out of fuel, resulting in undesired downtime for replacing the tank from an inconvenient location.

It would therefore be desirous to eliminate problems associated with prior art remote indicating devices while providing a signal to the operator when the tank reaches a predetermined low level condition.

BRIEF SUMMARY OF THE INVENTION

According to one aspect of the invention, a system for remotely determining a liquid level condition within a tank includes a liquid level gauge connectable to the tank, a dial assembly associated with the liquid level gauge and an optical transceiver for determining a reflectivity of the dial assembly. The gauge includes a float, a shaft operably connected to the float with the shaft being rotatable upon movement of the float in response to a change in liquid level within the tank, and a driving magnet connected to the shaft for rotation therewith. The dial assembly includes a reflective layer, a blocking layer positioned over the reflective layer for blocking at least a portion of the reflective layer, and a disk having a driven magnet that is magnetically coupled to the driving magnet such that rotation of the shaft causes rotation of the disk. One of the reflective and blocking layers is associated with the disk for rotation therewith. The optical transceiver is positioned for projecting radiant energy toward the reflective layer and detecting the presence or absence of reflected radiant energy and for generating a signal indicative of low liquid level within the tank when at least a substantial portion of the reflective layer is covered by the blocking layer.

According to a further aspect of the invention, a dial assembly for use with a liquid level gauge having a gauge head for connection to a tank includes a base adapted for connection to the gauge head, a lens connected to the base, a disk rotatably connected to at least one of the base and lens for rotation with respect thereto, a reflective layer connected to one of the base and disk; and a blocking layer positioned over the reflective layer for blocking at least a portion of the reflective layer upon rotation of the disk.

According to yet another aspect of the invention, a method of determining a low liquid level condition within a tank includes providing a liquid level gauge with an indicator dial, determining a reflectivity of the dial, and generating a low level warning signal when at least one of the following conditions occurs: a) the reflectivity is below a predetermined level, and b) a malfunction occurs during the determining step.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
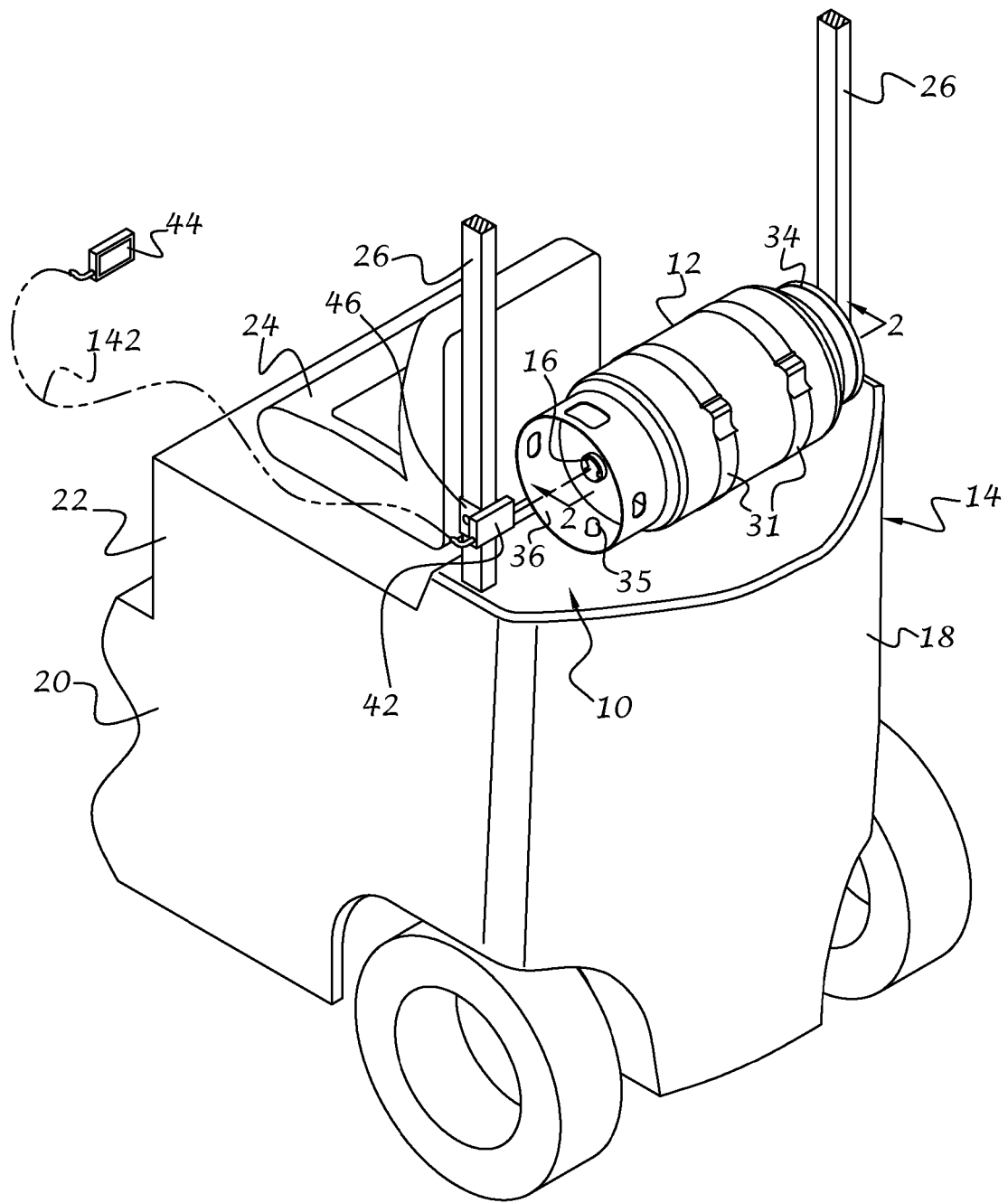
FIG. 1 is an isometric view of a system for remotely determining a liquid level condition within a tank associated with a forklift or other vehicle.

Referring to the drawings, and to FIG. 1 in particular, a system 10 for remotely determining a liquid level condition within a container 12 in accordance with a preferred embodiment of the invention is illustrated. In accordance with one adaptation of the preferred embodiment, the container 12 represents a propane tank or LP gas cylinder removably connected to a vehicle 14, such as a gas-powered forklift or the like.

The gas-powered forklift 14 is of conventional construction and accordingly is only partially shown in FIG. 1. The forklift 14 includes a counterweight 18 located at the rear end of a vehicle frame 20 for retaining balance of the forklift as heavyweight loads are lifted. An engine (not shown) is typically mounted at the center of the vehicle frame and usually is covered with a hood 22. A driver's seat 24 is typically fixedly secured to the hood 22 and is surrounded by an overhead guard (not shown) supported by rear upright members or columns 26 and front upright members (not shown) to define a protective cabin for the operator. The forklift 14 is powered by liquid propane and therefore includes the tank 12 which is removably mounted on support structure 30 (FIG. 2) of the counterweight and held in place by a pair of securing straps 31.

Figure 2:
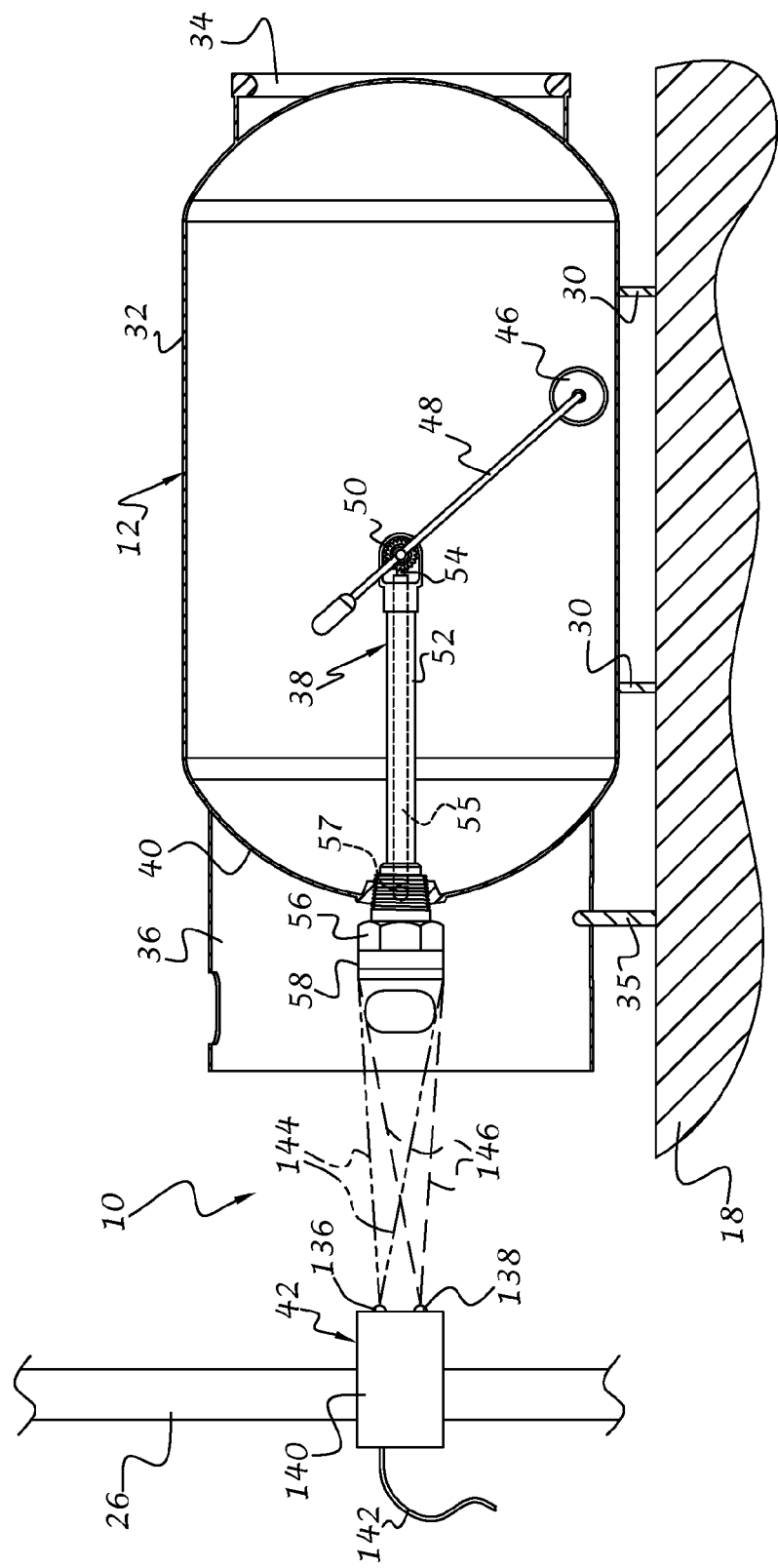
FIG. 2 is a sectional view of the system taken along line 2-2 of FIG. 1.
Figure 3:
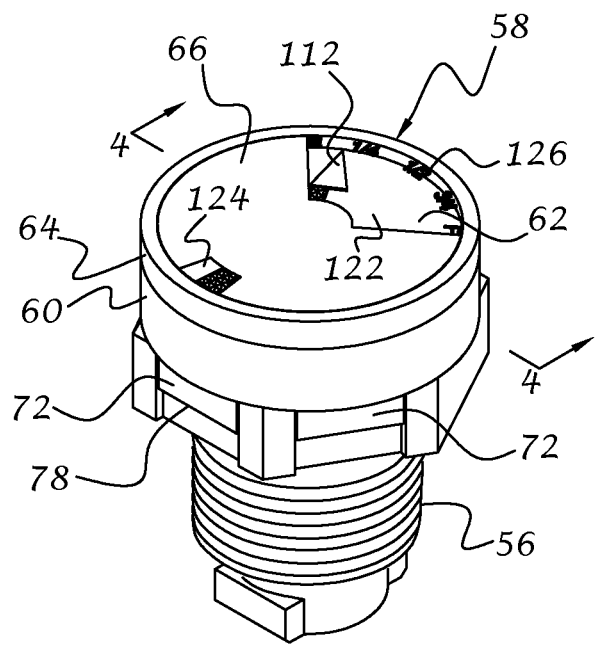
FIG. 3 is a top isometric view of a dial assembly in accordance with the present invention connected to a gauge head.
Figure 4:
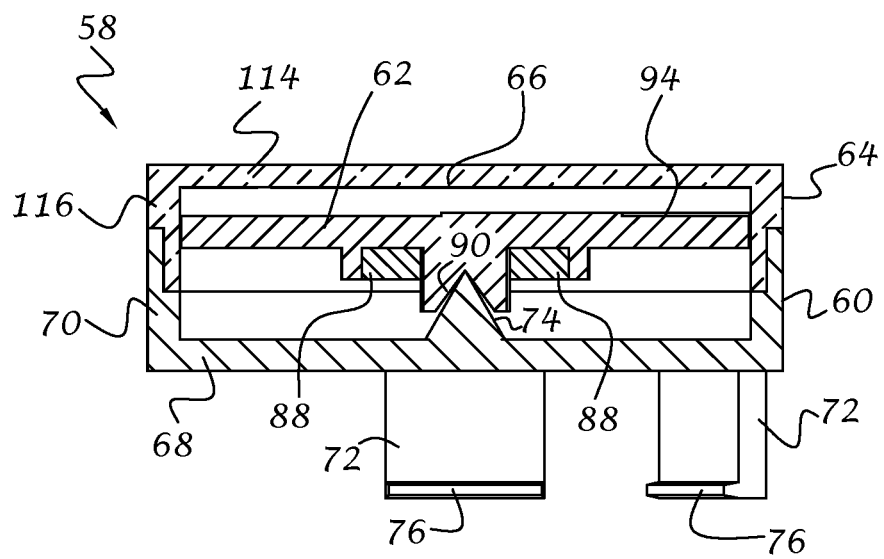
FIG. 4 is an enlarged sectional view of the dial assembly taken along line 4-4 of FIG. 3.
Figure 5:
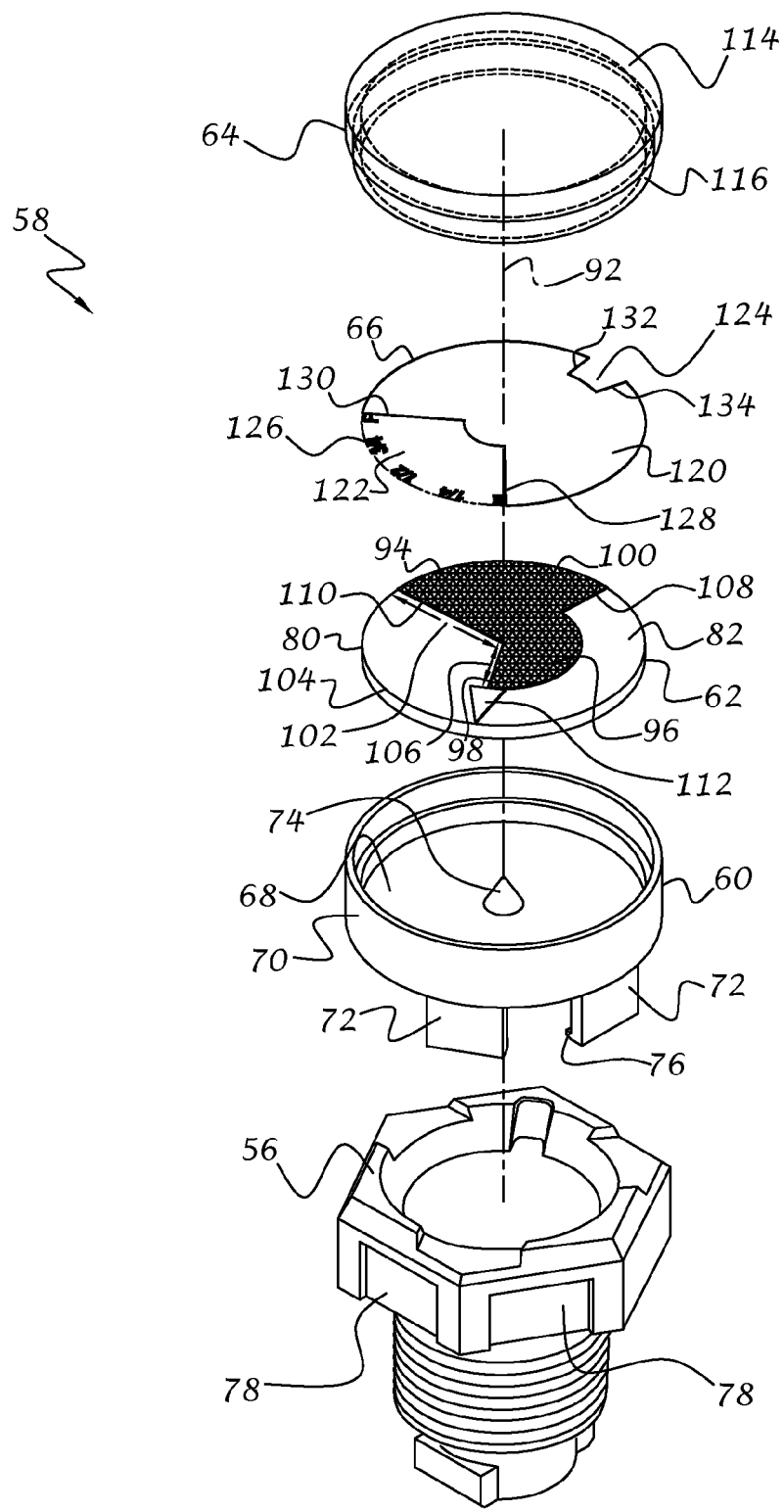
FIG. 5 is a top isometric exploded view of the dial assembly and gauge head.
Figure 6:
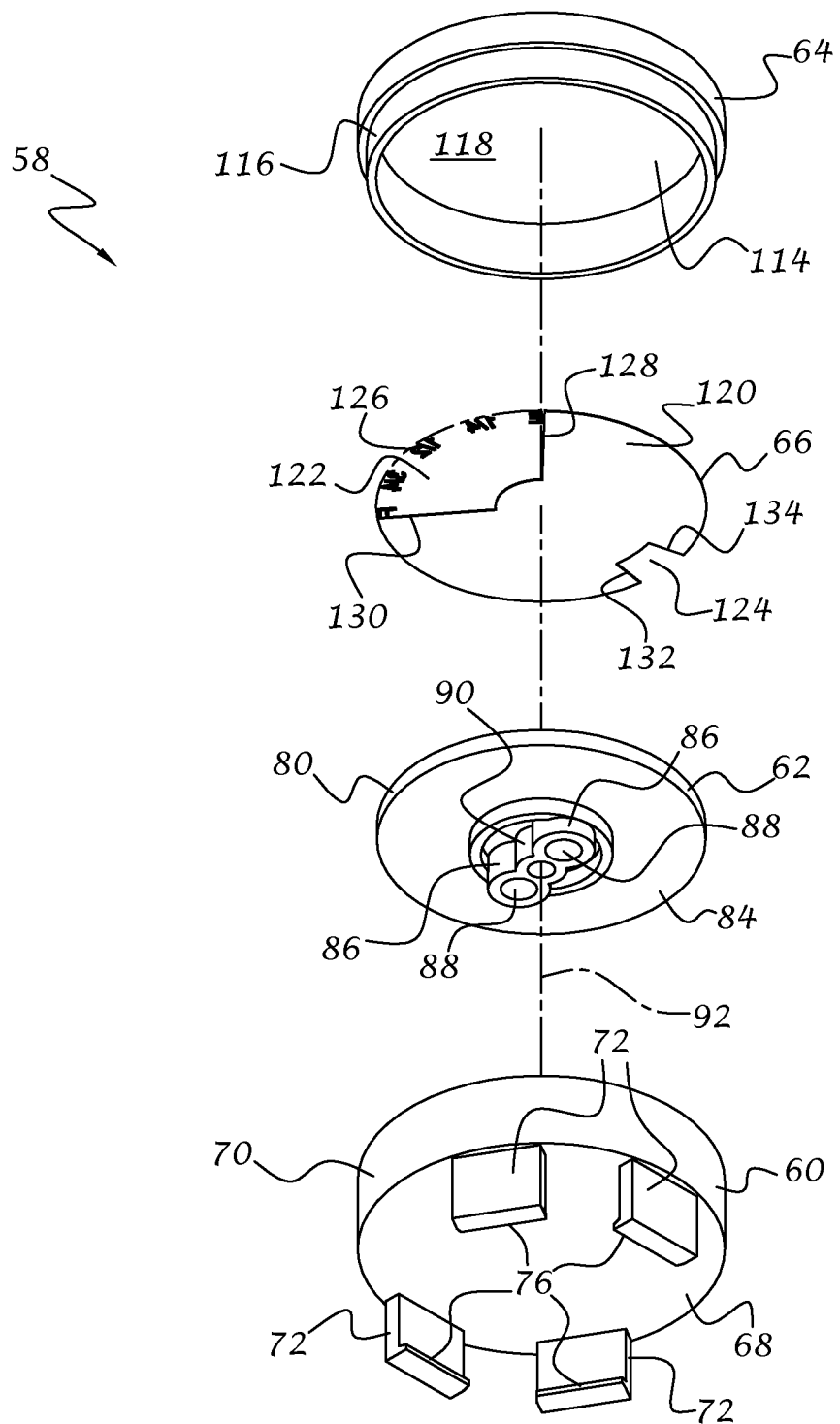
FIG. 6 is a bottom isometric exploded view of the dial assembly.

With additional reference to FIG. 2, the tank 12 is also of conventional construction and includes a pressure cylinder 32 for holding a quantity of propane, an annular base 34 located at one end of the cylinder 32 for orienting the cylinder in an upright position during storage, and an annular wall or valve guard 36 located at the opposite end of the cylinder 32. Although not shown, the tank 12 may include other components typically associated with a propane cylinder, such as a fill/supply valve, over-pressure safety valve, and so on. An alignment pin 35 extends from the counterweight 18 of the forklift and through an alignment slot or opening 37 to properly orient the tank on the forklift.

As will be appreciated, the present invention is not only applicable to propane tanks and forklifts, but may apply to other vehicles and/or stationary equipment as well as other containers where it is desirous to remotely determine a liquid level condition.

The system 10 of the present invention preferably includes a liquid level gauge 38 mounted to and extending through an end wall 40 of the tank 12 in a well-known manner, a dial assembly 58 connected to the gauge 38, an optical transceiver 42 connected to the forklift 14 for sensing a condition of the dial assembly 58, and an indicator 44 operably associated with the optical transceiver 42 for remotely indicating the gauge condition to an operator. As shown, the optical transceiver 42 is preferably connected to one of the rear columns 26 via a bracket 36 or other connecting means, such as adhesives, mechanical fasteners, hook and loop material, and so on. If needed, a pivoting or articulated arm (not shown) can be associated with the bracket for aligning the transceiver 42 with the end of the gauge 38. In accordance with one embodiment of the invention, the liquid level gauge 16 and optical transceiver 18 preferably work in conjunction to detect a predetermined low liquid level condition inside the tank 12, as will be described in greater detail below.

The indicator 44 can include any well-known means for visually and/or audibly alerting a person to the tank condition, including but not limited to speakers, warning lights, LED's, LCD or Oled displays, buzzers, chimes, and so on.

Preferably, the liquid level gauge 38 has a float 46 connected to a pivot arm 48 which is in turn connected to a gear 50 rotatably mounted on a hollow support tube 52 of the liquid level gauge 38. A spur gear 54 meshes with the gear 50 and causes rotation of a shaft 55 (shown in hidden line) extending through the support tube 52. The shaft in turn rotates a driving magnet 57 (shown in hidden line) within a mounting head 56 of the liquid level gauge 38. The dial assembly 58 is preferably attached to the mounting head 56 and is magnetically driven by the rotating driving magnet 57 to thereby indicate liquid level, as will be described in greater detail below. The mounting head 56 is in turn screwed into the end wall 40 of the tank 12 in a conventional manner. Further details of the liquid level gauge 38 can be found in U.S. Pat. No. 6,041,650 issued on Mar. 28, 2000 to Swinder et al., the disclosure of which is hereby incorporated by reference. It will be understood that other types of liquid level gauges can be used without departing from the spirit and scope of the present invention.

Referring now to FIGS. 3-6, the dial assembly 58, in accordance with a preferred embodiment of the invention, includes a base 60, a disk 62 mounted on the base for rotation with respect thereto, a lens or cap 64 connected to the base, and a blocking layer 66 connected to the lens 64.

The base 60 is preferably circular in construction and includes a bottom wall 68, a continuous side wall 70 extending upwardly from the bottom wall, locking fingers 72 extending downwardly from the bottom wall 68, and a conically-shaped pin 74 located at an axial center of the bottom wall and extending upwardly therefrom. Preferably, the locking fingers 72 each include an inwardly extending projection 76 that engages a corresponding slot 78 formed in the mounting head 56 so that the base 60 can be installed on the mounting head 56 in a snap-fit engagement. However, it will be understood that other embodiments can use alternative fastening means known in the art such as screws or other fasteners, without departing from the spirit and scope of the invention.

The disk 62 is preferably in the form of a circular-shaped body 80 with an upper surface 82 and a lower surface 84. A pair of spaced bosses 86 extend downwardly from the lower surface 84 and a driven magnet 88 is located in each boss. A center pivot 90 extends downwardly from the lower surface 84 between the bosses 86 and engages the pin 74 of the base 60 so that the disk 62 rotates in both clockwise and counterclockwise directions about a central axis 92 of the dial assembly 58 with respect to the base. It will be understood that other well-known means for rotatably connecting the disk 62 to the base 60 can be used. The driven magnets 88 are magnetically coupled to the driving magnet 57 associated with the shaft 55 of the liquid level gauge 38 and thus serve to cause corresponding rotation of the disk 62 when the float 46 is moved in response to a change in liquid level within the tank 12. Although the disk has been shown as rotatably connected to the base, the disk can alternatively or additionally be rotatably connected to the lens or other structure without departing from the spirit and scope of the invention.

A reflective layer 94 is located on the upper surface 82 of the disk 62 and preferably includes a first reflective segment 96 with a first radius 106 and a second reflective segment 100 with a second radius 102. Preferably, the second radius is greater than the first radius such that the second reflective segment 100 extends from a center of the disk 62 to an edge 104 thereof and the first reflective segment 96 extends to a position spaced from the edge. The first reflective segment 96 preferably terminates at a first leading edge 98 and extends peripherally around the disk and terminates at a second leading edge 108 associated with the second reflective segment 100. Preferably, the first and second leading edges extend at an obtuse angle. The second reflective segment 96 also preferably terminates at the second leading edge 108 and extends peripherally around the disk and terminates at a first trailing edge 110 of the second reflective segment 100. The significance of the reflective segments will be described in greater detail below with respect to FIGS. 7-10.

The reflective layer 94, including the first and second reflective segments, is preferably die-cut from a single piece of retro-reflective adhesive tape and applied to the upper surface 82 of the disk 62. A suitable retro-reflective tape, such as Scotchlite™ reflective tape by 3M, can include thousands of highly-efficient micro prisms that reflect radiant energy back toward the light source. It will be understood that the reflective layer can be formed from other reflective materials such as reflective glass, plastic or metallic materials or coatings, as well as paints or inks that are sprayed, screened or printed onto the disk 62, without departing from the spirit and scope of the present invention.

A pointer 112 is also preferably located on the upper surface 82 of the disk 62 and is preferably in alignment with or closely adjacent to the first leading edge 98 of the first reflective segment 96 for visually indicating a liquid level condition in conjunction with blocking layer 66. Although shown as triangular in shape, it will be understood that the pointer 112 can be of any suitable shape for indicating a liquid level condition. In accordance with a further embodiment of the invention, the pointer 112 can be eliminated and the first leading edge 98 of the first reflective segment 96 can serve as the pointer.

The lens 64 preferably includes an upper wall 114 and a continuous side wall 116 extending downwardly from the upper wall. The lens 64 can be constructed of any suitable transparent or translucent material which allows the observer to view the disk 62 and the blocking layer 66 through the upper wall 114. The side wall 116 preferably engages the side wall 70 of the base 60 when assembled and can be connected together through any well-known means such as adhesive bonding, heat welding, mechanical fastening, mutually engageable threads, friction fit, and so on.

The blocking layer 66 is preferably printed, screened or otherwise applied onto a lower surface 118 of the upper wall 114 and is therefore fixed against movement with the lens 64. However, it will be understood that the blocking layer 66 can be formed as a separate element and connected to the lens 64 through any well-known connecting means. The blocking layer 66 preferably includes an opaque region 120 with a first transparent section or window 122 and a second transparent section or window 124 located diametrically opposite the first window. When directly printed onto the lens 64, the first and second windows are preferably formed as cut-outs in the blocking layer. Preferably, the first window 122 is larger than the second window 124 and includes a scale 126 that denotes the liquid level condition within the tank 12, such as empty, ¼ tank, ½ tank, full, and so on. When the blocking layer 66 is formed as a separate element, the windows 122 and 124 are preferably formed as transparent sections of the blocking layer 66.

It will be understood that the term "transparent" as used herein does not necessarily refer to completely transparent but rather denotes sufficient transparency to allow an observer to visually determine a position of the underlying disk 62 with respect to the opaque region 120 and allow at least some radiant energy from the optical transceiver to traverse the windows. Likewise, it will be understood that the term "opaque" as used herein does not necessarily mean completely opaque but rather denotes a condition where transmission of radiant energy from the optical transceiver is sufficiently impaired to prevent a sufficient quantity or intensity of radiant energy to be reflected back to the transceiver.

The first window 122 is bordered by a first edge 128 and a second edge 130 of the opaque region 120 that respectively coincide with "empty" and "full" conditions of the tank 12. An angle A (FIG. 7) between the first and second edges 128, 130 is preferably sufficiently large to create a sufficiently long arc length to expose the pointer 112 and at least a portion of the first reflective segment 96 between the empty and full tank conditions (FIGS. 7-10) as denoted by the scale 126 when the disk 62 is rotated in response to movement of the float 46 (FIG. 2). Likewise, the second window 124 is bordered by a third edge 132 and a fourth edge 134 of the opaque region 120 that extend at an angle B to create a sufficiently long arc length so that at least a portion of the second reflective segment 100 is exposed during rotation of the disk 62 between the empty and full tank conditions.

In accordance with an exemplary embodiment of the invention, the angle A is approximately 100 degrees while the angle B is approximately 24 degrees for a particular liquid level gauge having a predefined angular rotation of the driving magnet 57 (FIG. 2) of approximately 100 degrees when the float 46 is moved in response to a change in liquid level within the tank 12 between empty and full tank positions.

It will be understood that the angles for the window edges, the arc lengths of the reflective segments and the amount of angular rotation of the disk 62, as well as the arc length and contents of the scale 126 can greatly vary and will depend at least in part on the particular liquid level gauge used and/or the type and amount of information related to liquid level to be displayed for visual observation and/or electronic detection.

Referring again to FIGS. 1 and 2, the optical transceiver 42 preferably includes a transmitter 136 that emits radiant energy in the electromagnetic spectrum and a receiver 138 that detects the emitted radiant energy. Preferably, the transmitter 136 comprises a LED that emits radiant energy in the near-infrared region of the electromagnetic spectrum and the receiver comprises a photosensor, such as a photodiode or phototransistor, that detects radiant energy in the near-infrared region. However, it will be understood that the transmitter and/or receiver can alternatively emit and receive radiant energy in the ultraviolet, visible and/or infrared light spectrums without departing from the spirit and scope of the present invention. The transmitter 136 and receiver 138 are preferably located within a housing 140 which is in turn connected to the mounting bracket 46. The housing may also include circuitry (not shown) for detecting when a predetermined condition has occurred and transmitting a signal via an electrical cable 142 to the indicator 44 to inform an operator of the predetermined condition. Preferably, the predetermined condition is a low liquid level condition of the tank 12 based on a predetermined reflected value detected by the receiver. The electrical cable 142 can also supply electrical power to the optical transceiver 42 from the forklift 14 or other power source. In accordance with a further embodiment of the invention, the optical transceiver 42 can be battery-powered and a signal can be sent to the indicator 44 via a wireless signal in a well-known manner.

As shown in FIG. 2, the transmitter 136 emits light toward the dial assembly 58, as represented by phantom lines 144.

The emitted light is then reflected toward the emitter 138, as shown by dashed lines 146, when at least a portion of one or more of the reflective regions 96, 100 (FIG. 5) is exposed through the blocking layer 66. Suitable and well-known techniques for reducing ambient noise can be employed, including but not limited to polarizing the light output, providing one or more light filters, generating a predetermined pattern of light pulses that is recognized by the receiver and related circuitry, and so on.

Figure 7:
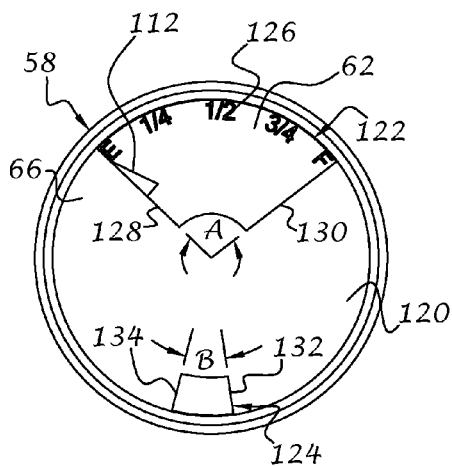
FIG. 7 is a top plan view of the dial assembly with a dial in a first position indicative of an empty tank condition.

Referring now to FIGS. 7-10, operation of the system 10 for remotely determining a liquid level condition within the tank 12 will now be described. As shown in FIG. 7, the pointer 112 of the disk 62 is in alignment with the "E" on the scale 126 of the blocking layer 66, thereby informing an observer that the tank 12 is empty or near empty. In this position, the first and second reflective segments 96, 100 are covered by the opaque region 120 so that no radiant energy (or an insignificant amount) from the transmitter 136 (FIG. 2) is reflected back to the receiver 138. In this position, a switch signal is preferably generated and sent to the indicator 44 to alert an operator of the low level or "empty" tank condition. Preferably, the reflective segments and opaque region are arranged to indicate a low level condition with sufficient contents in the tank to allow the forklift (or other vehicle) to return to the refueling station. In the event that the optical transceiver 42 malfunctions, the signal will still be sent to the indicator 44. A visual inspection of the dial assembly 58 will immediately inform an operator that a system malfunction has occurred when the pointer 112 is not aligned with an empty or near-empty condition, i.e. when the contents of the tank are sufficient to preclude a low level warning. This fail-safe mode of operation ensures, with a high level of confidence, that the system 10 is operating correctly when the indicator 44 does not receive a signal. At a particular low level condition, the low level signal may be sporadic due to fuel sloshing. Accordingly, well-known damping or delay techniques can be used for mechanically and/or electronically stabilizing the signal.

Figure 8:
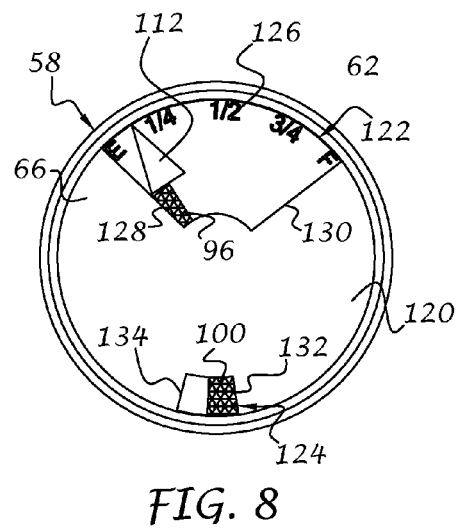
FIG. 8 is a top plan view of the dial assembly with the dial in a second position denoting a near-empty tank condition.
Figure 9:
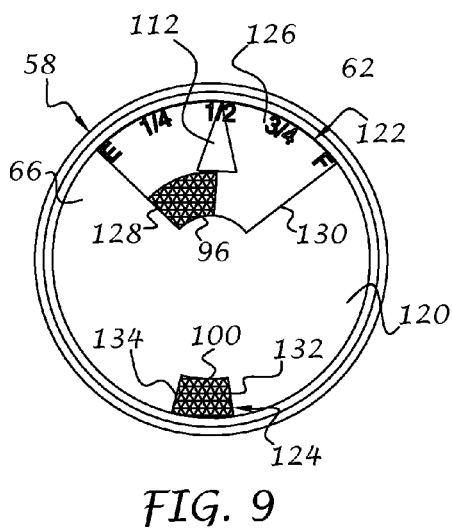
FIG. 9 is a top plan view of the dial assembly with the dial in a third position denoting a half-full tank condition.
Figure 10:
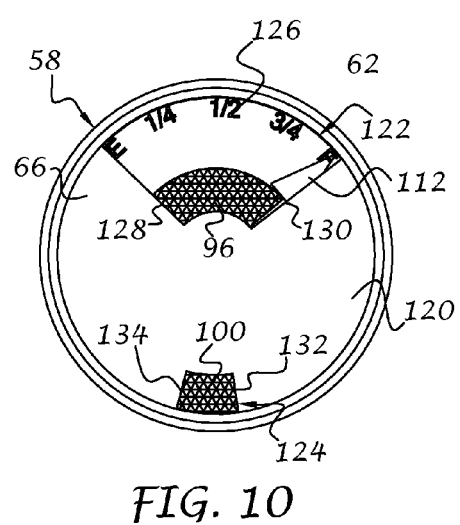
FIG. 10 is a top plan view of the dial assembly with the dial in a fourth position indicative of a full tank condition.

When the disk 62 rotates to a level condition greater than a predetermined low level condition, as shown in FIG. 8, a portion of the first reflective segment 96 and second reflective segment 100 will be exposed through the first window 122 and second window 124, respectively, of the blocking layer 66. In this position, a critical area of the reflective segments is exposed so that radiant energy from the transmitter 136 is reflected back to the receiver 138 with sufficient intensity to stop generation of the low level warning signal. Further rotation of the disk 62 toward the half-full and full tank positions, as shown in FIGS. 9 and 10, respectively, expose even more of the first and second reflective segments through their respective windows. Accordingly, a low level signal will be sent to the indicator 44 only when the exposed reflective area is insufficient to reflect a significant amount of radiant energy from the transmitter 136 or when the system 10 experiences a malfunction.

It will be understood that one of the windows can be eliminated where sufficient reflection is generated with a single window. It will be further understood that one or more of the windows can be enlarged or reduced in size to reveal more or less of the reflective area. In addition, more windows and/or reflective segments can be provided without departing from the spirit and scope of the present invention.

Figure 11:
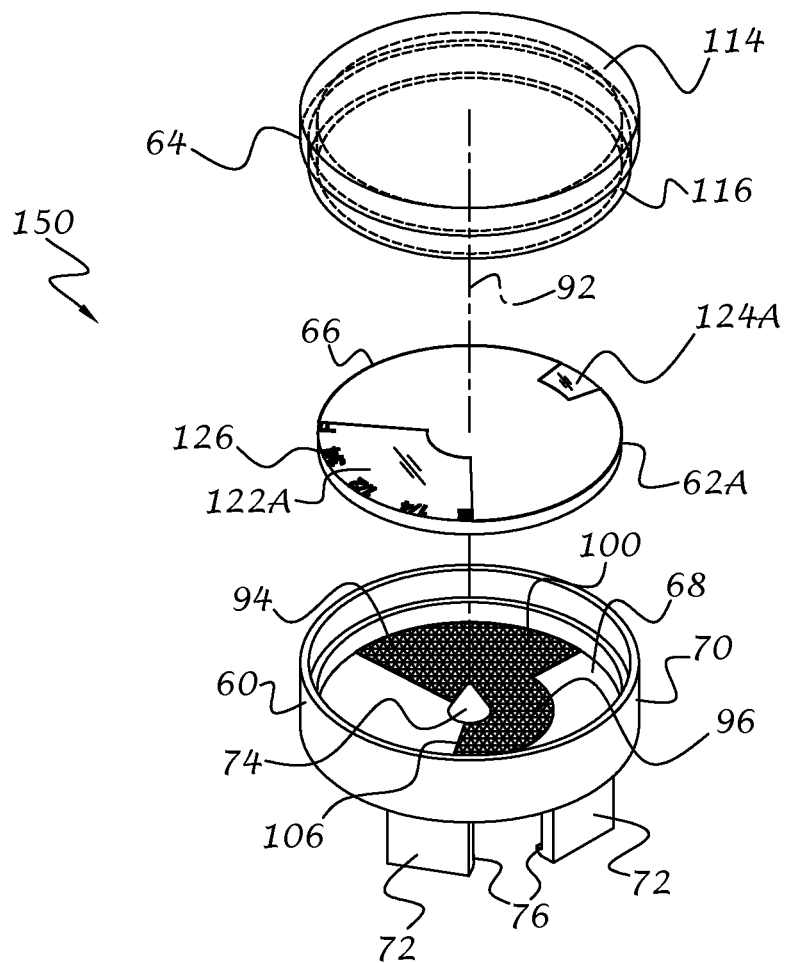
FIG. 11 is a top isometric view of a dial assembly in accordance with a further embodiment of the invention.

Referring now to FIG. 11, a dial assembly 150 in accordance with a further embodiment of the invention is illustrated. The dial assembly 150 is similar in construction to the dial assembly 58 previously described, with the exception that the reflective layer 94 is preferably located on an upper surface 152 of the bottom wall 68 of the base 60 and the blocking layer 66 is located on the disk 62A. In accordance with one embodiment of the invention, the disk 62A is formed of a transparent material and the blocking layer 66 is an opaque layer on the transparent material to form transparent windows 122A and 124A. In accordance with a further embodiment of the invention, the disk 62A is formed of an opaque material and the windows 122A and 122B are formed as cut-outs in the material.

With this arrangement, the reflective layer is fixedly connected to the base 60 and the blocking layer is fixedly connected to the magnetically-coupled disk 62A for rotation therewith in response to float movement. The scale 126 can either be associated with the disk 62A or with the base 60 in this embodiment and the pointer (not shown) is associated with the other of the disk and base. In accordance with yet a further embodiment of the invention, with the scale located on the disk 62A, the pointer can be eliminated and the leading edge 98 of the first reflective section 96 can function as the pointer for visually observing the liquid level condition within the tank. In accordance with yet another embodiment of the invention, with the scale located on the base 60, the leading edge 128 of the blocking layer 66 can serve as the pointer.

With the above-described embodiments, there is no need to remove sensor components from the tank prior to replacement, as in prior art magnetic flux field sensors. In addition, the operator need not be preoccupied with the liquid level condition of the tank until the low level warning signal is generated. Accordingly, the operator is better able to focus on the task at hand.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

What is claimed is:

1. A system for remotely determining a liquid level condition within a tank, the system comprising:
    a liquid level gauge connectable to the tank and comprising:
        a float;
        a shaft operably connected to the float, the shaft being rotatable upon movement of the float in response to a change in liquid level within the tank; and
        a driving magnet connected to the shaft for rotation therewith;
    a dial assembly operably associated with the liquid level gauge and comprising:
        a reflective layer;
        a blocking layer positioned over the reflective layer for blocking at least a portion of the reflective layer;
        a disk having a driven magnet magnetically coupled to the driving magnet wherein rotation of the shaft causes rotation of the disk, one of the reflective and blocking layers being associated with the disk for rotation therewith; and an optical transceiver positioned for projecting radiant energy toward the reflective layer and detecting the presence or absence of reflected radiant energy and for generating a signal indicative of low liquid level within the tank when at least a substantial portion of the reflective layer is covered by the blocking layer.

2. A system according to claim 1, wherein the reflective layer is connected to the disk for rotation therewith.

3. A system according to claim 2, wherein the reflective layer comprises at least one reflective segment.

4. A system according to claim 3, wherein the blocking layer includes at least one window for exposing the at least one reflective segment to the optical transceiver.

5. A system according to claim 4, wherein the blocking layer includes a scale extending across the at least one window indicative of a liquid level condition within the tank.

6. A system according to claim 5, wherein the dial assembly further comprises a base for connection to the liquid level gauge and a lens connected to the base, the disk being rotatably connected to at least one of the base and lens, with the blocking layer being located on the lens.

7. A system according to claim 6, wherein the reflective layer comprises a pointer in alignment with the scale for indicating the liquid level condition.

8. A system according to claim 1, wherein the reflective layer comprises a first reflective segment with a first radius and a second reflective segment with a second radius greater than the first radius.

9. A system according to claim 8, wherein the blocking layer includes a first window for exposing the first reflective segment and a second window for exposing the second reflective segment.

10. A system according to claim 9, wherein the blocking layer includes a scale extending across the first window indicative of a liquid level condition within the tank.

11. A system according to claim 10, wherein the reflective layer comprises a pointer in alignment with the scale for indicating the liquid level condition.

12. A system according to claim 9, wherein an arc length of the first window is greater than an arc length of the second window.

13. A system according to claim 1, wherein the blocking layer is associated with the disk for rotation therewith.

14. A dial assembly for use with a liquid level gauge having a gauge head for connection to a tank, the dial assembly comprising:

a base connectable to the gauge head;
a lens connected to the base;
a disk being rotatably connected to at least one of the base and lens for rotation with respect thereto;
a reflective layer connected to one of the base and disk; and
a blocking layer positioned over the reflective layer for blocking at least a portion of the reflective layer upon rotation of the disk;
wherein radiant energy reflected by the reflective layer is indicative of a first liquid level condition within the tank and the absence of reflected radiant energy is reflective of a second liquid level condition within the tank different from the first liquid level condition.

15. A dial assembly according to claim 14, wherein the reflective layer is connected to the disk for rotation therewith, and further wherein the blocking layer is connected to the lens.

16. A dial assembly according to claim 15, wherein the reflective layer comprises at least one reflective segment.

17. A dial assembly according to claim 16, wherein the blocking layer includes at least one window for exposing the at least one reflective segment.

18. A dial assembly according to claim 17, wherein the blocking layer includes a scale extending across the at least one window indicative of a liquid level condition within the tank.

19. A method of determining a low liquid level condition within a tank, the method comprising:

providing a liquid level gauge with an indicator dial with a reflective member and a blocking member for blocking at least a portion of the reflective member, the members being mutually rotatable upon a change in liquid level condition to selectively cover and expose an area of the reflective member;
determining a reflectivity of the dial dependent on the amount of exposed area of the reflective member; and
generating a low level warning signal when at least one of the following conditions occurs: a) the reflectivity is below a predetermined level, and b) a malfunction occurs during the step of determining a reflectivity of the dial.

* * * * *